3,336,308
NOVEL AMINO HALO-BENZYLAMINES
Johannes Keck, Biberach (Riss), Germany, assignor to Boehringer Ingelheim G.m.b.H., Ingelheim am Rhine, Germany, a corporation of Germany
No Drawing. Filed June 4, 1965, Ser. No. 461,492
Claims priority, application Germany, Oct. 14, 1963, T 24,890; Apr. 9, 1965, T 28,358
10 Claims. (Cl. 260—247.5)

This application is a continuation-in-part application of my copending applications Ser. No. 237,714 filed Nov. 14, 1962 and Ser. No. 403,339, filed Oct. 12, 1964, now abandoned.

The invention relates to novel amino-halo-benzylamines having a formula selected from the group consisting of

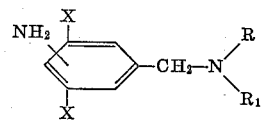

and

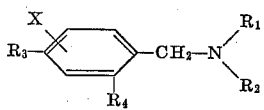

wherein G is a halogen selected from the group consisting of chlorine and bromine, R is selected from the group consisting of hydrogen, lower alkyl, hydroxy lower alkyl, halo lower alkyl, lower alkenyl, cyclo alkyl, aralkyl and aryl, $R_1$ and $R_2$ are selected from the group consisting of lower alkyl, lower alkenyl, cycloalkyl, aralkyl, hydroxy lower alkyl, halo lower alkyl, pyridyl lower akyl, and aryl, and R and $R_1$, and $R_1$ and $R_2$ when taken together with the nitrogen atom form a heterocyclic selected from the group consisting of pyrrolidino, lower alkyl pyrrolidino, piperidino, lower alkyl piperidino, piperazino, lower alkyl piperazino, hexamethylene imino, lower alkyl hexamethylene imino, and $R_1$ and $R_2$ together with the nitrogen atom also form a heterocyclic selected from the group consisting of lower alkyl morpholino and morpholino, and $R_3$ and $R_4$ are different and are selected from the group consisting of hydrogen and —$NH_2$ and their non-toxic, pharmacologically acceptable acid addition salts. Lower alkyl means alkyl having 1 to 7 carbon atoms. The invention also relates to novel compositions and method of increasing secretion of the trachea-bronchial, an of suppressing coughs.

The compounds of the invention may be prepared by methods which are well known in principle for the synthesis of other halogenated-amino-benzylamines. The following processes have been found to be especially advantageous but the compounds may also be prepared by other known analogous methods.

*Method A.*—Chlorination or bromination of aminobenzylamines of the formula

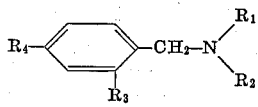

wherein $R_1$, $R_2$, $R_3$ and $R_4$ have the above definitions.

The reaction is performed in the presence of an inert organic solvent, preferably in the presence of a halogenated hydrocarbon or glacial acetic acid, and advantageously at room temperature. Two mols or a small excess thereover of the halogenation agent, such as chlorine or bromine, are used per mol of amino benzylamine. The hydrochloric or hydrobromic acid salts initially formed thereby may either be isolated directly and may be purified by recrystallization, or the compounds may be purified in known fashion by way of their free bases and may then be transformed into any other desired acid addition salt.

*Method B.*—Reaction of a (3,5-dihalo-diacylamino-benzyl) halide of the formula

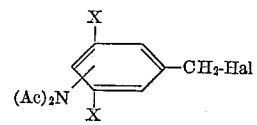

wherein X has the above definition, Hal is a halogen and Ac is any desired acyl radical with an amine of the formula

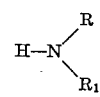

wherein R and $R_1$ have the above definition and subsequently splitting off the acyl radicals.

This reaction is performed in the presence of an agent which ties up or neutralizes the hydrogen halide split off by the reaction. An inorganic or tertiary organic base or also an excess of the amine of Formula IV may be used for this purpose, an excess of at least one mol of amine being used per mol of (3,5-dihalo-diacylamino-benzyl)-halide. The reaction is advantageously performed in the presence of an inert organic solvent, such as ethanol, benzene, toluene, etc., and at elevated temperatures, preferably at the boiling point of the particular solvent employed. In the event that an excess of the amine IV or a tertiary organic base is employed as the agent to tie up the hydrogen halide split off by the reaction, these agents may simultaneously serve as the solvent for the reactants.

The deacylation is effected according to known method, preferably by heating the acylated compound with a dilute mineral acid or a dilute inorganic base.

*Method C.*—Reduction of (halo-nitro-benzyl) amine of the formula

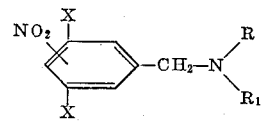

and

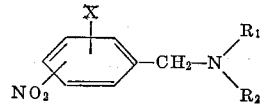

wherein R, $R_1$, $R_2$ and X have the above definitions.

The reaction is performed according to known methods, preferably by catalytic reduction, for instance, with hydrogen in the presence of precious metal catalysts, such as platinum or palladium, advantageously in a solvent, such as methanol, ethanol, tetrahydrofuran or dioxan; or by reduction with hydrazine hydrate Raney nickel, preferably in a solvent such as methanol; or by reduction with nascent hydrogen which is formed from iron, zinc or tin and a mineral acid, for example. However, the reduction may also be performed by any other known process for transformation of aromatic nitro compounds into aromatic amino compounds.

*Method D.*—By reduction of an amino-halo-benzamide of the formula

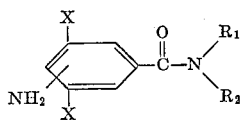

and

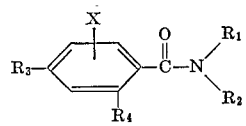

wherein R, $R_1$, $R_2$, $R_3$, $R_4$ and X have the above definitions.

The best yields are obtained by reducing the said benzamides with a complex metal halide, preferably lithium aluminum hydride. The reduction is carried out in an inert anhydrous organic solvent, preferably absolute ether, and at moderately elevated temperatures, most advantageously at the boiling point of the solvent. The reduced product can be isolated from the reaction mixture in customary fashion.

The starting materials for the above methods are known from the literature or may be prepared by methods described in the literature. For example, the diacylamino-halo-benzyl halides may be prepared by reacting 2-diacylamino-halotoluene with N-bromosuccinimide or with halogen under ultraviolet light. The nitro-halo-benzylamines may be prepared by reacting a nitro-halo-benzyl halide with an appropriate amine. The amino-halo-benzamides may be prepared by a halo-nitrobenzoyl halide with a secondary amine and reducing the nitro group of the intermediate to an amino group.

The free bases of the invention may be transformed by known methods into their non-toxic, pharmacologically acceptable acid addition salts, for instance, by reacting an alcoholic solution of the particular acid with the free base. Examples of suitable acids are inorganic acids such as hydrochloric acid, hydrobromic acid, sulfuric acid, phosphoric acid and organic acids such as lactic acid, citric acid, tartaric acid, maleic acid, 8-chlorotheophylline, etc. The said addition salts are water soluble.

The novel compounds of the invention possess useful pharmacodynamic properties in warm-blooded animals. More particularly, they exhibit an excellent secretolytic activity (increase bronchial secretions) with extremely low toxicity and cough-suppressing, monoaminooxidase-inhibiting and antipyretic activities.

The dosage unit of the compound of the invention is from 1 to 100 mg. depending upon the desired activity. Thus, the effective individual dose for increasing bronchial secretion is from 0.5 to 10 mg., preferably 2 to 4.0 mg., while the effective antitussive dose is 10 to 100 mg., preferably 25 to 50 mg. The compounds can be administered perorally or parenterally in the form of tablets, coated pills, syrups, aerosols, solutions, suspensions, suppositories, etc.

In the following examples there are described several preferred embodiments to illustrate the invention. However, it should be understood that the invention is not intended to be limited to the specific embodiments.

EXAMPLE 1

*Preparation of N-(2-amino-3,5-dibromobenzyl)-diethylamine hydrochloride*

A solution of 11.6 gm. of bromine in 50 cc. of chloroform was added dropwise to a solution of 6.4 gm. of 2-aminobenzyl diethylamine in 50 cc. of chloroform, accompanied by stirring. After all of the bromine solution had been added, the chloroform phase was shaken with 100 cc. of 2 N sodium hydroxide. The chloroform phase was then separated, dried over sodium sulfate and evaporated. The oily residue was identified to be N-(2-amino-3,5-dibromobenzyl)-diethylamine of the formula

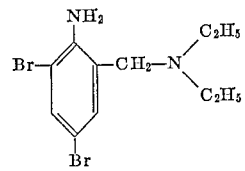

This compound was dissolved in 50 cc. of ethanol, and then hydrogen chloride was introduced into the solution, whereby the hydrochloride of the free base was obtained. The hydrochloride had a melting point of 214–214.5° C.

EXAMPLE 2

*Preparation of N-(4-amino-3,5-dibromobenzyl) - diethylamine hydrobromide*

A solution of 39.5 gm. of bromine in 150 cc. of glacial acetic acid was slowly added dropwise to a solution of 12.6 gm. of N-(4-aminobenzyl)-diethylamine in 150 cc. of glacial acetic acid, accompanied by stirring. The glacial acetic acid was decanted from the precipitate, and the precipitate was recrystallized from ethanol. It was identified to be N-(4-amino-3,5-dibromo-benzyl)-diethylamine hydrobromide of the formula

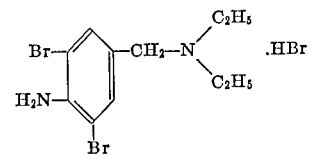

having a melting point of 218° C. (decomposition).

EXAMPLE 3

*Preparation of N-(2-amino-3,5-dibromobenzyl)-diisobutylamine hydrobromide*

A solution of 8.5 gm. of bromine in 30 cc. of glacial acetic acid was added dropwise to a solution of 6.09 gm. of 2-aminobenzyl-diisobutylamine in 150 cc. of glacial acetic acid, accompanied by stirring. The glacial acetic acid was decanted from the precipitate formed thereby, and the precipitate was recrystallized from ethyl acetate. It was identified to be N-(2-amino-3,5-dibromobenzyl)-diisobutylamine hydrobromide of the formula

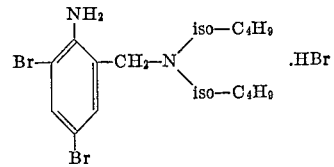

having a melting point of 165–167° C.

EXAMPLE 4

*Preparation of N-(2-amino-3,5-dibromobenzyl) - diallylamine hydrochloride*

A mixture of 24.7 gm. of 2-diacetylamino-3,5-dibromobenzyl bromide, 11.8 gm. of diallylamine, and 300 cc. of ethanol was refluxed for 24 hours. Thereafter, the alcohol was distilled off and the residue was dissolved in 1 liter of hot 3 N hydrochloric acid and the solution was refluxed for 12 hours. Subsequently, the solution was made alkaline with 10 N sodium hydroxide, and the alkaline solution was shaken three times with 300 cc. portions of chloroform. The chlorfoorm extract solutions were combined, dried over sodium sulfate and then the chloroform was evaporated. The residue was identified to be N-(2-amino-3,5-dibromobenzyl)-diallylamine of the formula

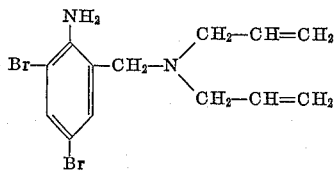

The residue was dissolved in a small amount of ethanol, and then gaseous hydrogen chloride was introduced into the solution, whereby a precipitate formed. This precipitate was separated by vacuum filtration and was dissolved in about one liter of ethyl acetate. Upon concentration of the solution to about 300 cc., N-(2-amino-3,5-dibromobenzyl)-diallylamine hydrochloride crystallized out. It had a melting point of 109–113° C.

EXAMPLE 5

*Preparation of N-(4-amino-3,5-dibromobenzyl)-diallylamine hydrochloride*

A mixture of 20.3 gm. of 4-diacetylamino-3,5-dibromobenzyl bromide, 6.9 gm. of diallylamine and 300 cc. of anhydrous ethanol was refluxed for 20 hours. Thereafter, the ethanol was distilled off and the oily residue was dissolved in one liter of hot 3 N hydrochloric acid. The resulting solution was refluxed for 10 hours. Subsequently, the reaction solution was made alkaline with 10 N sodium hydroxide and was shaken three times with 700 cc. portions of chloroform. The chlorofrom extract solutions were combined, dried over sodium sulfate and concentrated. The partly oily and partly solid residue was taken up in absolute ethanol and the solution was filtered until clear. It was found to be a solution of N-(4-amino-3,5-dibromobenzyl)-diallylamine of the formula

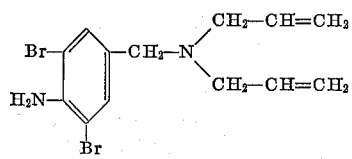

in ethanol. Thereafter, the solution was concentrated to about 50 cc. and hydrogen chloride was introduced. After a short period of time the hydrochloride of N-(4-amino-3,5-dibromobenzyl)-diallylamine crystallized out. It had a melting point of 191–195° C.

EXAMPLE 6

*Preparation of N-(2-amino-3,5-dibromobenzyl)-N-methyl-cyclohexylamine*

A solution of 29.3 gm. of bromine in 50 cc. of glacial acetic acid was slowly added dropwise to a solution of 15.9 gm. of N-(2-aminobenzyl)-N-methyl-cyclohexylamine, acocmpanied by stirring. The glacial acetic acid was decanted from the precipitate formed during the addition of the bromine solution, and the precipitate was thereafter shaken with 200 cc. of 2 N sodium hydroxide and 600 cc. of chloroform until all of the solids went into solution. The chloroform phase was allowed to separate from the aqueous phase. The chloroform phase was decanted, evaporated to dryness and the residue was dissolved in absolute ether. The resulting solution was found to be a solution of N-(2-amino-3,5-dibromobenzyl)-N-methyl-cyclohexylamine of the formula

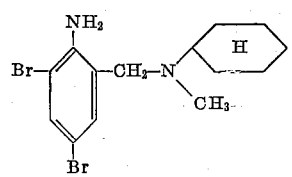

in ethanol. Upon introducing hydrogen chloride into this solution, the hydrochloride of N-(2-amino-3,5-dibromobenzyl)-N-methyl-cyclohexylamine precipitated out. It had a melting point of 232–235° C. (decomposition).

The p-toluene sulfonate ($C_{21}H_{28}Br_2N_2O_3S$) had a melting point of 218–219° C. (decomposition).

The perchlorate ($C_{14}H_{21}Br_2ClN_2O_4$) had a melting point of 132.5–134° C.

The phosphate ($C_{14}H_{23}Br_2N_2O_4P$) had a melting point of 137–138.5° C.

The hydrobromide ($C_{14}H_{21}Br_3N_2$) had a melting point of 227.5–228° C. (decomposition).

The oxalate ($C_{16}H_{22}Br_2N_2O_4$) had a melting point of 182–183° C.

The nitrate ($C_{14}H_{21}Br_2N_3O_3$) had a melting point of 135–136° C.

The sulfate ($C_{14}H_{22}Br_2N_2SO_4 \cdot C_3H_7OH$) had a melting point of 108–109° C.

EXAMPLE 7

*Preparation of N-(4-amino-3,5-dibromo-benzyl)-N-methylbenzylamine hydrobromide*

A solution of 31.6 gm. of bromine in 30 cc. of glacial acetic acid was added dropwise to a solution of 18.0 gm. of N - (4 - amino-benzyl)-N-methyl-benzylamine, accompanied by stirring. The precipitate formed thereby was separated from the glacial acetic acid by decanting, and the precipitate was recrystallized from ethanol. It was identified to be N-(4-amino-3,5-dibromo-benzyl)-N-methylbenzylamino hydrobromide of the formula

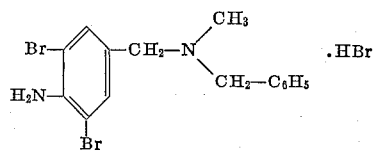

having a melting point of 202–206° C.

EXAMPLE 8

*Preparation of N-(2-amino-3,5-dibromobenzyl)-pyrrolidine hydrochloride*

17.0 gm. of N-(o-aminobenzyl)pyrrolidine were dissolved in 500 cc. of chloroform, and the resulting solution was admixed in small portions at room temperature, accompanied by stirring, with a solution of 34.0 gm. of bromine in 500 cc. of chloroform (which corresponds to a ratio of 2.2 mols of bromine per mol of N-(o-aminobenzyl)-pyrrolidine). The reaction product, which initially separated out as an oil was allowed to stand for about half an hour while repeatedly stirring and scraping the sides of the container with a glass rod, whereupon crystallization set in gradually. The yellow crystals were separated by vacuum filtration and were washed with a small amount of chloroform. The crystals were thereafter dissolved in hot water, the resulting solution was made alkaline to a pH of 11 with concentrated ammonia, and the alkaline solution was shaken four times with 250 cc. portions of chloroform. The chloroform extract solutions were combined, dried with soda, filtered and the chloroform was distilled off in vacuo. A brownish oil remained as a residue, which was identified to be N-(2-amino-3,5-dibromobenzyl)-pyrrolidine of the formula

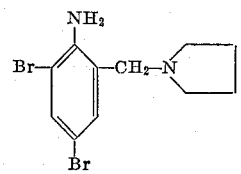

This residue was dissolved in 44 cc. of absolute ethanol and the solution was heated to a temperature of 40–50° C. The clear solution was then admixed with 35 cc. of aqueous 10% hydrochloric acid. The mixture was allowed to stand at 0° C. for several hours, whereupon the hydrochloride of N-(2-amino-3,5-dibromobenzyl)-pyrrolidine crystallized out in the form of colorless, fine crystals, which were separated by vacuum filtration and washed with ether. The hydrochloride had a melting point of 219–220° C.

EXAMPLE 9

*Preparation of N-(2-amino-3,5-dibromobenzyl)-piperidine hydrochloride*

A solution of 16.3 gm. of bromine in 100 cc. of chloroform was added dropwise to a solution of 9.67 gm. of N-(2-aminobenzyl)-piperidine in 150 cc. of chloroform, accompanied by stirring. The resulting reaction mixture was shaken with 200 cc. of 2 N sodium hydroxide, the chloroform phase was separated, and the aqueous phase was again shaken with chloroform. The combined chloroform phases were dried over sodium sulfate and evaporated. The residue was identified to be N-(2-amino-3,5-dibromobenzyl)-piperidine of the formula

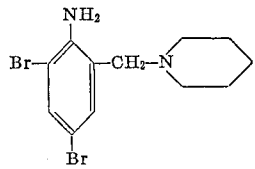

The residue was dissolved in about 100 cc. of ethanol, the solution was admixed with 15 cc. of concentrated hydrochloric acid and the acid solution was allowed to stand. N-(2-amino-3,5-dibromobenzyl)-piperidine hydrochloride crystallized out in the form of leaflets having a melting point of 244–245° C.

EXAMPLE 10

Using a procedure analogous to that described in Example 1, N-(2-amino-3,5-dibromobenzyl)-dimethylamine of the formula

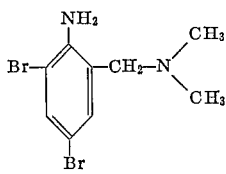

was prepared from bromine and N-(2-aminobenzyl)-dimethylamine.

Its hydrochloride had a melting point of 235–237° C.

EXAMPLE 11

Using a procedure analogous to that described in Example 1, N-(2-amino - 3,5 - dibromobenzyl)-di-n-propylamine of the formula

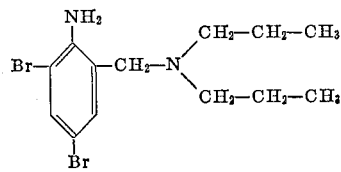

was prepared from N-(2-aminobenzyl)-di-n-propylamine and bromine.

Its hydrochloride had a melting point of 153–156° C.

EXAMPLE 12

Using a procedure analogous to that described in Example 1, N-(2-amino-3,5-dibromobenzyl)-diisopropylamine of the formula

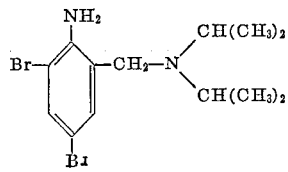

was prepared from bromine and N-(2-aminobenzyl)-diisopropylamine.

Its hydrochloride had a melting point of 159–160° C.

EXAMPLE 13

Using a procedure analogous to that described in Example 3, N-(2-amino-3,5-dibromobenzyl)-dipentylamine hydrobromide of the formula

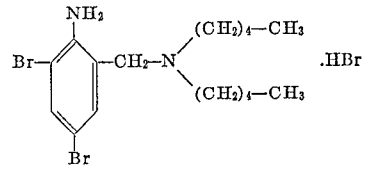

was prepared from bromine and N-(2-aminobenzyl)-dipentylamine. The product had a melting point of 111–113° C.

EXAMPLE 14

Using a procedure analogous to that described in Example 4, N-(2-amino-3,5-dibromobenzyl)-dicyclohexylamine of the formula

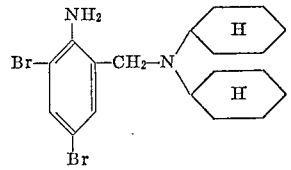

was prepared from 2-diacetylamino-3,5-dibromobenzyl bromide and dicyclohexylamine.

Its hydrobromide had a melting point of 308–312° C. (decomposition).

EXAMPLE 15

Using a procedure analogous to that described in Example 9, N-(2-amino-3,5-dibromobenzyl)-3-methyl-piperidine of the formula

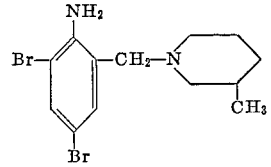

was prepared from bromine and N-(2-aminobenzyl)-3-methyl-piperidine. Its hydrochloride had a melting point of 209–215° C.

EXAMPLE 16

Using a procedure analogous to that described in Example 3, N-(2-amino - 3,5 - dibromobenzyl)-N-methyl-benzylamine hydrobromide of the formula

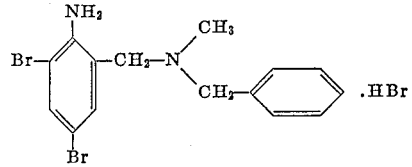

was prepared from bromine and N-(2-aminobenzyl)-N-methyl-benzylamine. The product had a melting point of 218.5–219° C. (decomposition).

EXAMPLE 17

Using a procedure analogous to that described in Example 3, N-(2-amino-3,5-dibromobenzyl)-N-ethylbenzylamine hydrobromide of the formula

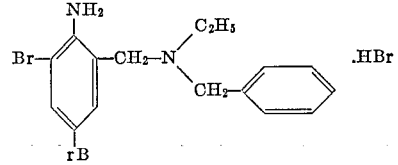

was prepared from bromine and N-(2-aminobenzyl)-N-ethylbenzylamine. The product had a melting point of 179–182° C.

EXAMPLE 18

Using a procedure analogous to that described in Example 3, N-(2-amino-3,5-dibromobenzyl)-dibenzylamine hydrobromide of the formula

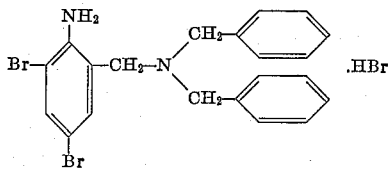

was prepared from bromine and N-(2-aminobenzyl)-dibenzylamine. The product had a melting point of 192–196° C.

EXAMPLE 19

Using a procedure analogous to that described in Example 4, N-(2-amino-3,5-dibromobenzyl)-N-ethylphenylamine of the formula

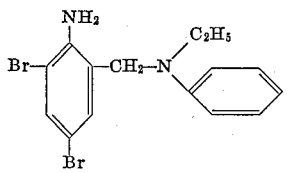

was prepared from 2-diacetylamino-3,5-dibromobenzyl-bromide and ethyl-phenylamine.

Its hydrochloride had a melting point of 123–130° C.

EXAMPLE 20

Using a procedure analogous to that described in Example 1, N-(4-amino-3,5-dibromobenzyl)-dimethylamine of the formula

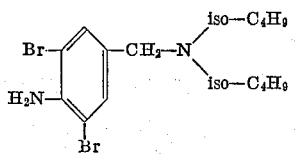

was prepared from bromine and N-(4-aminobenzyl)-dimethylamine.

Its hydrochloride had a melting point of 252–256° C.

EXAMPLE 21

Using a procedure analogous to that described in Example 2, N-(4-amino-3,5-dibromobenzyl)-di-n-propylamine hydrobromide of the formula

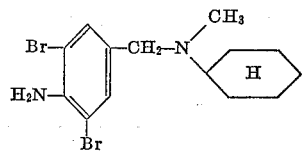

was prepared from bromine and N-(4-aminobenzyl)-di-n-propylamine. The product had a melting point of 227° C. (decomposition).

EXAMPLE 22

Using a procedure analogous to that described in Example 1, N - (4 - amino - 3,5 - dibromobenzyl) - diisobutylamine of the formula

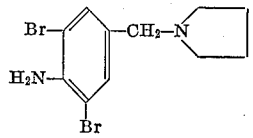

was prepared from bromine and N-(4-aminobenzyl)-diisobutylamine.

Its hydrochloride had a melting point of 141–144° C.

EXAMPLE 23

Using a procedure analogous to that described in Example 6, N-(4-amino-3,5-dibromobenzyl)-N-methylcyclohexylamine of the formula

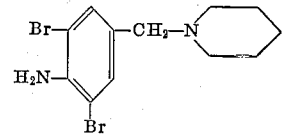

was prepared from bromine and N-(4-aminobenzyl)-N-methylcyclohexylamine.

Its hydrochloride had a melting point of 232–235° C.

EXAMPLE 24

Using a procedure analogous to that described in Example 5, N-(4-amino-3,5-dibromobenzyl)-pyrrolidine of the formula

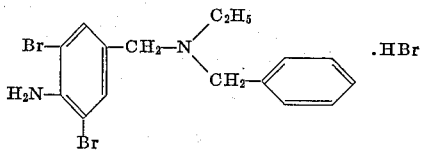

was prepared from (4-diacetylamino-3,5-dibromobenzyl)-bromide and pyrrolidine.

Its hydrochloride had a melting point of 200–205° C.

EXAMPLE 25

Using a procedure analogous to that described in Example 9, N-(4-amino-3,5-dibromobenzyl)-piperidine of the formula

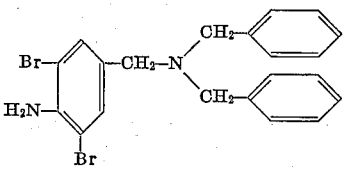

was prepared from N-(4-aminobenzyl)-piperidine and bromine.

Its hydrobromide had a melting point of 224–226° C. (decomposition).

EXAMPLE 26

Using a procedure analogous to that described in Example 2, N-(4-amino-3,5-dibromobenzyl)-N-ethylbenzylamine hydrobromide of the formula was prepared from bromine and N-(4-aminobenzyl)-N-ethylbenzylamine. The product had a melting point of 198–203° C.

EXAMPLE 27

Using a procedure analogous to that described in Example 1, N-(4-amino-3,5-dibromobenzyl)-dibenzylamine of the formula was prepared from bromine and N-(4-aminobenzyl)-dibenzylamine.

EXAMPLE 28

Using a procedure analogous to that described in Example 4, N-(4-amino-3,5-dibromobenzyl)-N-ethylphenylamine of the formula

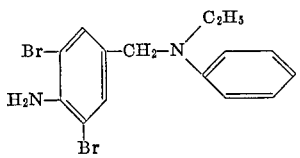

was prepared from (4-diacetylamino-3,5-dibromobenzyl)-bromide and ethyl-phenylamine.

Its hydrochloride had a melting point of 211–215° C.

EXAMPLE 29

*Preparation of N-(2-amino-3,5-dichlorobenzyl)piperidine*

(a) *Preparation of 3,5-dichloro-2-diacetylaminotoluene.*—A mixture of 19 gm. of 3,5-dichloro-2-acetaminotoluene [A. Claus and E. Stapelberg, Annalen 274, 285–304 (1893)] and 250 cc. of acetic acid anhydride was refluxed for 2 hours. Thereafter, the excess acetic acid anhydride was distilled off and the solid residue was recrystallized from ethanol. It was identified to be 3,5-dichloro-2-diacetylamino-toluene having a melting point of 84–86° C.

(b) *Preparation of (3,5 - dichloro - 2 - diacetylaminobenzyl)-bromide.*—A mixture of 15.1 gm. of 3,5-dichloro-2-diacetylamino-toluene, 11.0 gm. of N-bromosuccinimide, 0.5 gm. of dibenzoylperoxide and 250 cc. of carbon tetrachloride was refluxed until the undissolved matter, which initially collected at the bottom of the flask, floated at the surface of the solvent (after about 10 hours of refluxing). The reaction mixture was allowed to cool, was filtered, and the filtrate was evaporated to dryness. The solid residue was recrystallized from ethanol. It was identified to be (3,5-dichloro-2-diacetylaminobenzyl)-bromide having a melting point of 122–125° C.

(c) *Preparation of N-(2-amino-3,5-dichlorobenzyl)-piperidine.*—A mixture of 9.5 gm. of (3,5-dichloro-2-diacetylaminobenzyl)-bromide, 5 gm. of piperidine and 250 cc. of ethanol was refluxed for 18 hours. After distilling off the solvent, the reaction product was dissolved in 1 liter of 3 N hydrochloric acid, and the solution was again refluxed for 18 hours. Thereafter, the reaction solution was made alkaline (pH 10) with 10 N sodium hydroxide, and the alkaline solution was exhaustively extracted with chloroform. The combined chloroform extract solutions were dried over sodium sulfate and were then concentrated until an oily residue remained. The oily residue was identified to be N-(2-amino-3,5-dichlorobenzyl)-piperidine of the formula

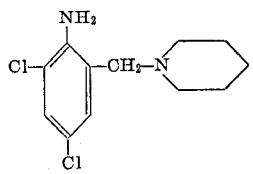

It was dissolved in 50 cc. of absolute ethanol, and gaseous hydrogen chloride was introduced into solution, whereupon a crystalline precipitate formed, which was identified to be the hydrochloric acid addition salt of N-(2-amino-3,5-dichlorobenzyl)-piperidine. After recrystallization from ethanol, the melting point of the hydrochloride was 234–235° C. (decomposition).

EXAMPLE 30

*Preparation of N-(4-amino-3,5-dichlorobenzyl)-N-methyl-cyclohexylamine*

(a) *Preparation of 3,5-dichloro-4-diacetylamino-toluene.*—A mixture of 10 gm. of 3,5-dichloro-4-acetylamino-toluene [E. Lellmann and C. Klotz, Annalen 231, 308–326 (1886)] and 30 cc. of acetic acid anhydride was refluxed for 2 hours. Thereafter, the excess acetic acid anhydride was distilled off and the residue was recrystallized from petroleum ether. It was identified to be 3,5-dichloro-4-diacetylamino-toluene having a melting point of 59–60° C.

(b) *Preparation of 3,5-dichloro-4-diacetylaminobenzyl bromide.*—A mixture of 30 gm. of 3,6-dichloro-4-diacetylamino-toluene, 21 gm. of N-bromosuccinimide, 3 gm. of dibenzoylperoxide and 450 cc. of carbon tetrachloride (dried over phosphorus pentoxide) was refluxed until the undissolved matter, which initially collected at the bottom of the flask, floated on the surface of the solvent (after about 8 hours refluxing). The reaction mixture was allowed to cool, was filtered, and the filtrate was evaporated until an oily residue remained. The residue was recrystallized from ethanol. It was identified to be (3,5-dichloro-4-diacetylaminobenzyl)-bromide having a melting point of 106–123° C.

(c) *Preparation of N-(3,5-dichloro-4-aminobenzyl)-N-methyl-cyclohexylamine.*—A mixture of 13.5 gm. of (3,5-dichloro-4-diacetylaminobenzyl)-bromide, 9 gm. of N-methyl-cyclohexylamine and 250 cc. of absolute ethanol was refluxed for 6 hours. Thereafter, the solvent was distilled off and the oily residue was boiled for 16 hours with 3 N hydrochloric acid. Subsequently, the acid solution was made alkaline (pH 10) with approximately 10 N sodium hydroxide. An oily precipitate formed, which crystallized upon standing. The crystallizate was separated by vacuum filtration and was recrystallized from ethanol. It was identified to be N-(3,5-dichloro-4-aminobenzyl)-N-methyl-cyclohexylamine of the formula

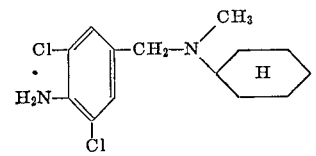

having a melting point at 62–64° C.

EXAMPLE 31

Using a procedure analogous to that described in Example 29, N - (2-amino-3,5-dichlorobenzyl)-N-methyl-cyclohexylamine of the formula

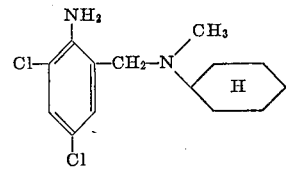

was prepared from (3,5-dichloro-2-diacetylaminobenzyl)-bromide and N-methyl-cyclohexylamine.

Its hydrochloride had a melting point of 224–225° C. (decomposition).

EXAMPLE 32

Using a procedure analogous to that described in Example 29, N - (2 - amino-3,5-dichlorobenzyl)-diisobutyl amine of the formula

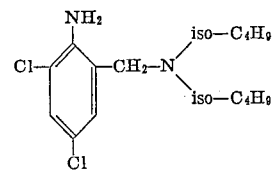

was prepared from 3,5-dichloro-2-diacetylaminobenzyl-bromide and diisobutylamine.

Its hydrochloride had a melting point of 142–148° C.

EXAMPLE 33

Using a procedure analogous to that described in Example 30, N-(3,5-dichloro-4-aminobenzyl)-diethylamine of the formula

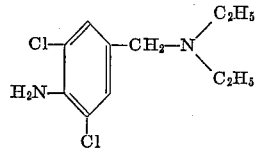

was prepared from 3,5-dichloro-4-diacetylaminobenzyl-bromide and diethylamine. Its sulfate had a melting point of 132–134° C.

EXAMPLE 34

Using a procedure analogous to that described in Example 30, N - (3,5 - dichloro-4-aminobenzyl)-dibenzyl-amine of the formula

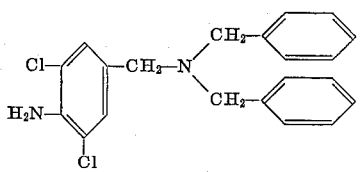

was prepared from 3,5-dichloro-4-diacetylaminobenzyl-bromide and dibenzylamine.

Its hydrochloride had a melting point of 237.5–238° C. (decomposition).

EXAMPLE 35

*Preparation of N-(2-amino-3,5-dibromobenzyl)-isobutylamine*

(a) *Preparation of N-(2-nitro-benzylidene)-isobutylamine.*—A solution of 1.51 gm. of 2-nitro-benzaldehyde and 0.73 gm. of isobutylamine in ethanol was refluxed for 5 hours. Thereafter, the solvent was distilled off, leaving an oily residue which was identified to be raw N-(2-nitrobenzylidene)-isobutylamine. This raw product was used without further purification in the subsequent step.

(b) *Preparation of N - (2 - aminobenzyl) - isobutylamine.*—2 gm. of the raw N-(2-nitrobenzylidene)-isobutylamine obtained in step (a) were dissolved in 30 cc. of freshly distilled methanol, and the resulting solution was introduced into a duck-shaped hydrogenation vessel and was there catalytically hydrogenated with hydrogen in the presence of platinum as a catalyst. The reaction mixture absorbed 4 mols of hydrogen. After the hydrogenation had gone to completion, the reaction mixture was filtered to separate the catalyst, and the solvent was distilled out of the filtrate. 1.7 gm. of N-(2-aminobenzyl)-isobutylamine remained as a residue.

(c) *Preparation of N-(2-amino-3,5-dibromobenzyl)-isobutylamine.*—1.7 gm. of N-(2-aminobenzyl)-isobutyl-amine (obtained in step (b)) were dissolved in 40 cc. of glacial acetic acid, and the resulting solution was admixed with 1.64 gm. of sodium acetate. Thereafter, a solution of 3.2 gm. of bromine in 10 cc. of glacial acetic acid was slowly added dropwise thereto at room temperature accompanied by thorough stirring. After the reaction had gone to completion, the glacial acetic acid was distilled off, the residue was admixed with 60 cc. of chloroform and 60 cc. of 2 N sodium hydroxide, and the resulting mixture was shaken. The aqueous phase was separated from the chloroform phase and was again shaken twice with 60 cc. portions of chloroform. The chloroform extract solutions were combined, dried over sodium sulfate, filtered, and the solvent was distilled out of the filtrate. 2.56 gm. of a brown, viscous oil were obtained as a residue, which was identified to be N-(2-amino-3,5-dibromobenzyl)-isobutylamine of the formula

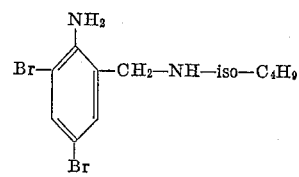

This product was dissolved in 15 cc. of absolute ethanol, and gaseous hydrogen chloride was introduced into the solution until saturation. The precipitate formed thereby was separated by vacuum filtration, washed with ethyl acetate, dried and recrystallized from 25 cc. of absolute ethanol. It was identified to be the hydrochloride of N-(2-amino - 3,5 - dibromobenzyl)-isobutylamine having a melting point of 211–213° C. (decomposition).

EXAMPLE 36

*Preparation of N-(3,5-dibromo-4-aminobenzyl)-cyclohexylamine*

(a) *Preparation of N-(4-aminobenzyl)-cyclohexyl-amine.*—2.38 gm. of N-(4-nitro-benzylidene)-cyclohexyl-amine (F. G. Baddar, J.C.S. London 1950, 136–139) were dissolved in 60 cc. of freshly distilled methanol, the resulting solution was introduced into a duck-shaped hydrogen vessel and was there hydrogenated with hydrogen in the presence of platinum as a catalyst. The reaction mixture absorbed 4 mols of hydrogen. After completion of the hydrogenation, the catalyst was filtered off and the solvent was distilled out of the filtrate. An oil remained as a residue, which was identified to be N-(4-amino-benzyl)-cyclohexylamine. This product was used in the subsequent step without further purification.

(b) *Preparation of N-(3,5-dibromo-4-aminobenzyl)-cyclohexylamine.*—2.19 gm. of the raw N-(4-amino-benzyl)-cyclohexylamine obtained in step (a) were dissolved in 50 cc. of glacial acetic acid, and the resulting solution was admixed with 1.85 gm. of sodium acetate. To this mixture a solution of 3.6 gm. of bromine in 15 cc. of glacial acetic acid was slowly added dropwise at room temperature, accompanied by thorough stirring. After completion of the reaction, the glacial acetic acid was distilled off, the light brown residue was admixed with 150 cc. of chloroform and 150 cc. of 2 N sodium hydroxide, and the mixture was shaken. The aqueous phase was separated from the chloroform phase and was again shaken twice with 150 cc. portions of chloroform. The chloroform phases were combined, dried over sodium sulfate, filtered, and the solvent was distilled off. 2.92 gm. of a brown oil remained behind, which was identified to be N-(3,5-dibromo-4-aminobenzyl)cyclohexylamine of the formula

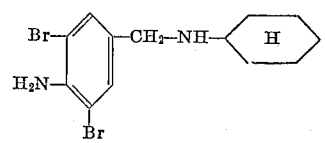

This product was dissolved in 15 cc. of absolute ethanol, and gaseous hydrogen chloride was introduced into this solution until saturation. A precipitate formed which was separated by vacuum filtration, dried and recrystallized from absolute ethanol. It was identified to be the hydrochloride of N-(3,5-dibromo-4-aminobenzyl)-cyclohexyl-amine having a melting point of 259–262° C. (decomposition).

EXAMPLE 37

Using a procedure analogous to that described in Example 35, N-(3,5-dibromo-2-aminobenzyl)-cyclohexylamine of the formula

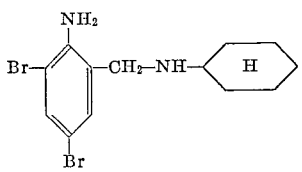

was prepared from N-(2-aminobenzyl)-cyclohexylamine and bromine.

Its hydrochloride had a melting point of 247–248° C. (decomposition).

EXAMPLE 38

Using a procedure analogous to that described in Example 35, N-(3,5-dibromo-4-aminobenzyl)-isobutylamine of the formula

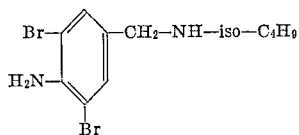

was prepared from N-(4-aminobenzyl)-isobutylamine and bromine.

Its hydrochloride had a melting point of 180–183° C.

EXAMPLE 39

Using a procedure analogous to that described in Example 1, N-(4-amino-3,5-dibromobenzyl)-dicyclopentylamine of the formula

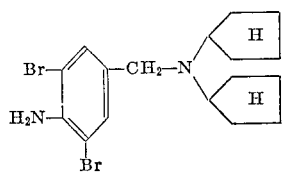

was prepared from bromine and N-(4-aminobenzyl)-dicyclopentylamine.

Its hydrochloride had a melting point of 189–197° C. (decomposition).

EXAMPLE 40

*Preparation of N,N-diisopropyl-(2-amino-4-bromobenzyl)-amine*

A solution of 44 gm. of N,N-diisopropyl-(2-nitro-4-bromobenzyl)-amine in 200 cc. of methanol was admixed with about 2 gm. of Raney nickel. To the resulting mixture a solution of 19 gm. of 80% hydrazine hydrate in 50 cc. of methanol was slowly added dropwise accompanied by stirring. Thereafter, the reaction mixture was stirred for a short period of time at about 60° C. The Raney nickel catalyst was then separated by vacuum filtration through infusorial earth, and the filtrate was evaporated under an aspirator pump vacuum. The oily residue was distilled twice in a high vacuum. The fraction passing over between 105° and 120° C. at 0.03 mm. Hg was identified to be N,N-diisopropyl-(2-amino-4-bromo-benzyl)-amine of the formula

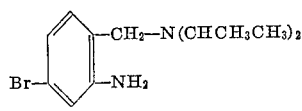

The product thus obtained was dissolved in absolute ethanol, and the resulting solution was saturated with hydrogen chloride gas, yielding the dihydrochloride of N,N-diisopropyl-(2-amino-4-bromo-benzyl)-amine which had a melting point of 182–187° C. (decomposition).

EXAMPLE 41

*Preparation of N,N-diamyl-(2-amino-4-bromo-benzyl)-amine*

A solution of 27 gm. of N,N-diamyl-(2-nitro-4-bromobenzyl)-amine in 200 cc. of methanol was admixed with about 2 gm. of Raney nickel, and to the resulting mixture a solution of 10.6 gm. of 80% hydrazine hydrate in 50 cc. of methanol was slowly added dropwise, accompanied by stirring. The reaction mixture was then stirred for a short period of time at about 60° C. The Raney nickel catalyst was separated by vacuum filtration through infusorial earth, and the filtrate was evaporated in an aspirator pump vacuum. The oily residue was then distilled in a high vacuum. The fraction passing over between 150 and 154° C. at 0.13 mm. Hg was identified to be N,N-diamyl-(2-amino-4-bromo-benzyl)-amine of the formula

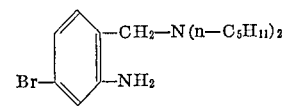

Its dihydrochloride, obtained by dissolving the free base in absolute ethanol and saturating the resulting solution with hydrogen chloride gas and adding a small amount of ether, had a melting point of 128–132° C.

EXAMPLE 42

*Preparation of N-(2-amino-4-bromo-benzyl)-3-methyl-piperidine*

33 gm. of N-(2-nitro-4-bromo-benzyl)-3-methyl-piperidine were dissolved in 200 cc. of methanol, about 2 gm. of Raney nickel were added, and the mixture was admixed dropwise, while stirring, with a solution of 13.1 gm. of 80% hydrazine hydrate in 50 cc. of methanol. The reaction mixture was then stirred for some time at about 60° C. The Raney nickel catalyst was separated by vacuum filtration through infusorial earth, and the filtrate was evaporated in an aspirator pump vacuum. The oily residue was distilled in a high vacuum. The fraction passing over between 136 and 142° C. at 0.02 mm. Hg was identified to be N-(2-amino-4-bromo-benzyl)-3-methyl-piperidine of the formula

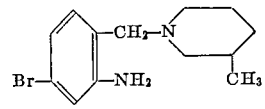

Its dihydrochloride, obtained by dissolving the free base in absolute ethanol and saturating the resulting solution with hydrogen chloride gas, had a melting point of 227–228° C. (decomposition).

EXAMPLE 43

*Preparation of N-cyclohexyl-N-methyl-(2-amino-4-bromobenzyl)-amine*

About 2 gm. of Raney nickel were added to a solution of 24 gm. of N-cyclohexyl-N-methyl-(2-nitro-4-bromobenzyl)-amine in 200 cc. of methanol, and the resulting mixture was admixed dropwise, while stirring, with a solution of 10.6 gm. of 80% hydrazine hydrate in 50 cc. of methanol. The reaction mixture was then stirred for a short period of time at 60° C. The Raney nickel catalyst was separated by vacuum filtration through infusorial earth, and the filtrate was evaporated in an aspirator pump vacuum. The initially oily residue, which gradually crystallized, was distilled in a high vacuum. The fraction passing over between 140 and 144° C. at 0.18 mm. Hg crystallized and was recrystallized from ethanol, whereupon it had a melting point of 78–81° C. It was identified to be N - cyclohexyl - N - methyl-(2-amino-4-bromo-benzyl)-amine of the formula

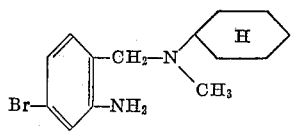

EXAMPLE 44

*Preparation of N-allyl-N-cyclohexyl-(2-amino-4-bromo-benzyl)-amine*

500 cc. of concentrated hydrochloric acid were added to a mixture of 26.5 gm. of N-allyl-N-cyclohexyl-(2-nitro-4-bromo-benzyl)-amine and 82 gm. of stannous chloride, and the mixture was heated for 2 hours at 90–95° C. Thereafter, the reaction mixture was diluted with 750 cc. of water, the aqueous solution was extracted three times with 300 cc. portions of ether, and the acid aqueous phase was made alkaline with 10 N sodium hydroxide. The resulting alkaline solution was thoroughly extracted with chloroform, and the chloroform phase was separated, dried over sodium sulfate and evaporated in an aspirator pump vacuum. The oily residue was distilled in a high vacuum. The fraction passing over between 144° and 150° C. at 0.01 mm. Hg was identified to be N-allyl-N-cyclohexyl-(2-amino-4-bromo-benzyl)-amine of the formula

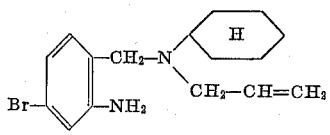

Its dihydrochloride, obtained by dissolving the free base in ethanol and acidifying the resulting solution with concentrated hydrochloric acid, had a melting point of 192–195° C. (decomposition).

EXAMPLE 45

*Preparation of N-(2-bromo-4-amino-benzyl)-piperidine*

From 2 to 3 gm. of Raney nickel were added to a solution of 25.5 gm. of N-(2-bromo-4-nitro-benzyl)-piperidine in 300 cc. of methanol, and the resulting mixture was admixed dropwise, while stirring, with a solution of 8.6 gm. of 80% hydrazine hydrate in 50 cc. of methanol. After the endothermic reaction had gone to completion, the reaction mixture was stirred at room temperature for some time, whereupon the Raney nickel catalyst was separated by vacuum filtration through infusorial earth, and the filtrate was evaporated in an aspirator vacuum. The oily residue was identified to be N-(2-bromo-4-amino-benzyl)-piperidine of the formula

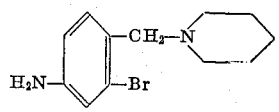

It was dissolved in a small amount of ethanol and the resulting solution was saturated with hydrogen chloride. The hydrochloride thus obtained was recrystallized from a mixture of ethanol and acetone, whereupon it had a melting point of 205–206° C.

EXAMPLE 46

Using a procedure analogous to that described in Example 40, N,N - dimethyl - (2 - amino-4-bromo-benzyl)-amine was prepared from N,N-dimethyl-(2-nitro-4-bromo-benzyl)-amine. Its dihydrochloride had a melting point of 207–209° C. (decomposition).

EXAMPLE 47

Using a procedure analogous to that described in Example 40, N,N-diethyl-(2-amino-4-bromo-benzyl)-amine was prepared from N,N-diethyl-(2-nitro-4-bromo-benzyl)-amine. Its dihydrochloride had a melting point of 196–199° C. (decomposition).

EXAMPLE 48

Using a procedure analogous to that described in Example 40, N,N - di-n-propyl-(2-amino-4-bromo-benzyl)-amine was prepared from N,N-di-n-propyl-(2-nitro-4-bromo-benzyl)-amine. Its dihydrochloride had a melting point of 177–183° C.

EXAMPLE 49

Using a procedure analogous to that described in Example 41, N,N - di - n - butyl-(2-amino-4-bromo-benzyl)-amine was prepared from N,N-di-n-butyl-(2-nitro-4-bromobenzyl)-amine. Its dihydrochloride had a melting point of 140–145° C.

EXAMPLE 50

Using a procedure analogous to that described in Example 41, N,N - diisobutyl - (2-amino-4-bromo-benzyl)-amine was prepared from N,N-diisobutyl-(2-nitro-4-bromo-benzyl)-amine. Its dihydrochloride had a melting point of 182–184° C. (decomposition).

EXAMPLE 51

Using a procedure analogous to that described in Example 42, N-(2-amino-4-bromo-benzyl)-piperidine was prepared from N-(2-nitro-4-bromo-benzyl)-piperidine. Its dihydrochloride had a melting point of 212–214° C.

EXAMPLE 52

Using a procedure analogous to that described in Example 42, N-(2-amino-4-bromo-benzyl)-2-methyl-piperidine was prepared from N-(2-nitro-4-bromo-benzyl)-2-methyl-piperidine. The free base had a melting point of 72–78° C.

EXAMPLE 53

Using a procedure analogous to that described in Example 42, N-(2-amino-4-bromo-benzyl)-4-methyl-piperidine was prepared from N-(2-nitro-4-bromo-benzyl)-4-methyl-piperidine. Its dihydrochloride had a melting point of 208–210° C. (decomposition).

EXAMPLE 54

Using a procedure analogous to that described in Example 43, N-(2-amino-4-bromo-benzyl)-2-ethyl-piperidine was prepared from N-(2-nitro-4-bromo-benzyl)-2-ethyl-piperidine. Its dihydrochloride had a melting point of 198–201° C. (decomposition).

EXAMPLE 55

Using a procedure analogous to that described in Example 43, N - ethyl - N - cyclohexyl - (2-amino-4-bromo-benzyl)-amine was prepared from N-ethyl-N-cyclohexyl-(2-nitro-4-bromo-benzyl)-amine. Its dihydrochloride had a melting point of 193–198° C. (decomposition).

EXAMPLE 56

Using a procedure analogous to that described in Example 42, N - (2 - amino-4-bromo-benzyl)-morpholine of the formula

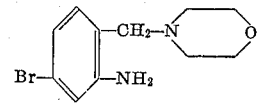

was prepared from N-(2-nitro-4-bromo-benzyl)-morpholine. The free base had a melting point of 96–99° C.

EXAMPLE 57

Using a procedure analogous to that described in Example 45, N,N-diethyl-(2-bromo-4-amino-benzyl)-amine was prepared from N,N-diethyl-(2-bromo-4-nitro-benzyl)-amine. Its hydrochloride had a melting point of 152–154° C.

EXAMPLE 58

Using a procedure analogous to that described in Example 45, N,N - di-n-propyl-(2-bromo-4-amino-benzyl)-amine was prepared from N,N-di-n-propyl-(2-bromo-4-nitro-benzyl)-amine. Its hydrochloride had a melting point of 154–157° C.

EXAMPLE 59

Using a procedure analogous to that described in Example 45, N-(2-bromo-4-amino-benzyl)-morpholine was prepared from N-(2-bromo-4-nitro-benzyl)-morpholine. The free base had a melting point of 100–101° C.

EXAMPLE 60

Using a procedure analogous to that described in Example 45, N-(2-bromo-4-amino-benzyl)-2-methyl-piperidine was prepared from N-(2-bromo-4-nitro-benzyl)-2-methyl-piperidine. Its hydrochloride had a melting point of 179–180° C.

EXAMPLE 61

Using a procedure analogous to that described in Example 45, N-(2-bromo-4-amino-benzyl)-2-ethyl-piperidine was prepared from N-(2-bromo-4-nitro-benzyl)-2-ethyl-piperidine. Its hydrochloride had a melting point of 174–176° C.

EXAMPLE 62

Using a procedure analogous to that described in Example 45, N - cyclohexyl - N-methyl-(2-bromo-4-amino-benzyl)-amine was prepared from N-cyclohexyl-N-methyl-(2-bromo-4-nitro-benzyl)-amine. Its hydrochloride had a melting point of 178–181° C. (decomposition).

EXAMPLE 63

*Preparation of N-cyclohexyl-N-methyl-(2-chloro-4-amino-benzyl)-amine*

A solution of 30 gm. of N-cyclohexyl-N-methyl-(2-chloro-4-amino-benzamide) in 400 cc. of absolute tetrahydrofuran was added dropwise over a period of one hour, accompanied by stirring, to a boiling mixture consisting of 11.4 gm. of lithium aluminum hydride and 300 cc. of absolute tetrahydrofuran. After all of the benzamide solution had been added, the reaction mixture was refluxed for a few hours and then the excess lithium aluminum hydride was decomposed with ethyl acetate, water and aqueous 10% sodium hydroxide. The inorganic precipitate formed thereby was separated, and the aqueous phase was extracted with chloroform. The extract solution and the previously separated organic phase were combined, dried over sodium sulfate and concentrated by evaporation. The oily residue was identified to be raw N-cyclohexyl-N-methyl-(2-chloro-4-amino-benzyl)-amine of the formula

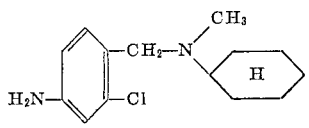

The oily substance was dissolved in 100 cc. of ethanol, and the resulting solution was saturated with hydrogen chloride gas. Thereafter, 80 cc. of ether and 120 cc. of ethyl acetate were added, whereby a precipitate formed which was recrystallized from a mixture of ethanol and ethyl acetate acidified with hydrochloric acid. The product was the dihydrochloride of N-cyclohexyl-N-methyl-(2-chloro-4-amino-benzyl)-amine with a melting point of 188–194° C. (decomposition).

EXAMPLE 64

*Preparation of N-cyclohexyl-N-methyl-(2-amino-5-bromo-benzyl)-amine*

17.1 gm. of N-methyl-cyclohexylamine were added to a solution of 25.8 gm. of 2-diacetylamino-5-bromo-benzylbromide in 0.5 liter of carbon tetrachloride. The reaction mixture was refluxed for one hour and then cooled, the precipitated N-methyl-cyclohexylammonium bromide was separated by vacuum filtration, and the filtrate was evaporated in an aspirator vacuum. The residue was dissolved in 580 cc. of ethanol, 320 cc. of concentrated hydrochloric acid were added, and the acid solution was refluxed for 16 hours. After completion of the acid hydrolysis the reaction solution was concentrated to about 50 cc., whereby the dihydrochloride of N-cyclohexyl-N-methyl-(2-amino-5-bromo-benzyl)-amine of the formula

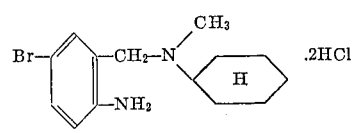

precipitated out. The precipitate was separated and recrystallized from absolute ethanol, whereupon it had a melting point of 195–198° C. (decomposition).

EXAMPLE 65

Using a procedure analogous to that described in Example 64, N,N-diethyl-(2 - amino - 5 - bromo-benzyl)-amine was prepared from 2-diacetylamino-5-bromo-benzylbromide and diethylamine. Its dihydrochloride had a melting point of 200–204° C. (decomposition).

EXAMPLE 66

Using a procedure analogous to that described in Example 64, N,N-di-n-propyl-(2 - amino-5-bromo-benzyl)-amine was prepared from 2-diacetylamino-5-bromo-benzylbromide and di-n-propylamine. Its dihydrochloride had a melting point of 183–186° C. (decomposition).

EXAMPLE 67

Using a procedure analogous to that described in Example 64, N-(2-amino-5-bromo-benzyl)-piperidine was prepared from 2-diacetylamino-5-bromo - benzylbromide and piperidine. Its dihydrochloride had a melting point of 203–207° C. (decomposition).

EXAMPLE 68

*Preparation of N,N-diisopropyl-(2-amino-5-bromo-benzyl)-amine*

39.4 gm. of diisopropylamine were added to a solution of 64.5 gm. of 5-bromo-2-diacetylamino-benzylbromide in 0.9 l. of carbon tetrachloride and the reaction mixture was held at reflux for one hour and then cooled. The precipitated diisopropyl ammonium bromide was suction filtered, and the filtrate was concentrated under water-jet vacuum. The remaining residue was dissolved in 520 cc. of ethanol and after 280 cc. of concentrated hydrochloric acid had been added, it was held at reflux over a period of 20 hours. After saponification, the solution was concentrated to about 80 cc. and the N,N-diisopropyl-(2-amnio-5-bromobenzyl)-amine crystallized therefrom as the dihydrochloride. Upon recrystallization from absolute ethanol, the compound had a melting point of 183–188° C. with decomposition.

EXAMPLE 69

*Preparation of N,N-dipropyl-(2-amino-6-chloro-benzyl)-amine*

A solution of 7.6 gm. of N,N-dipropyl-(6-chloro-2-nitro-benzyl)-amine in 50 cc. of methanol was admixed with about 0.5 gm. of Raney nickel. While stirring, a solution of 3.8 gm. of 80% hydrazine hydrate in 10 cc. of methanol was added dropwise to this mixture. The reaction mixture was then stirred for a while longer at a temperature of about 60° C. and then the Raney nickel was removed by suction filtration through Celite 545. The filtrate was concentrated under water-jet vacuum and the oily residue was dissolved in absolute ethanol and saturated with hydrochloric acid gas. The resulting N,N-dipropyl-(2-amino-6-chlorobenzyl)-amine dihydrochloride

21 after recrystallization from absolute ethanol had a melting point of 185–190° C. with decomposition.

EXAMPLE 70

*Preparation of N-cyclohexyl-N-methyl-(2-amino-5-bromo-benzyl)-amine*

6.3 gm. of N-cyclohexyl-N-methyl-2-amino-5-bromobenzamide were dissolved in 150 cc. of absolute tetrahydrofuran and this solution was slowly added dropwise with stirring to a suspension of 1.9 gm. of lithium aluminum hydride in 50 cc. of tetrahydrofuran. Next, the reaction mixture was heated at reflux for 3 hours after which the excess lithium aluminum hydride was decomposed with a solution of ethyl acetate, water and 15% sodium hydroxide. The organic solution was decanted and the residue was extracted with chloroform. The organic phases were combined, dried over sodium sulfate and concentrated under vacuum. The residue was dissolved in absolute ethanol and the solution was saturated with hydrochloric acid gas and N-cyclohexyl-N-methyl-(2-amino-5 - bromo-benzyl) - amine dihydrochloride crystallized therefrom. The product was recrystallized from absolute ethanol to obtain a product having a melting point of 195–198° C. with decomposition.

EXAMPLE 71

*Preparation of N-(2-amino-5-bromo-benzyl)-hexamethyleneimine*

While stirring, 48 gm. of bromine in 60 cc. of glacial acetic acid were added dropwise to a solution of 24.8 gm. of N-(2-acetyl-amino-benzyl)-hexamethyleneimine in 250 cc. of glacial acetic acid which had been heated in presence of iron powder to 80° C. After concentration of the solution, N-(2-acetyl-amino-5-bromo-benzyl)-hexamethyleneimmonium bromide precipitated and was then dissolved in 300 cc. of ethanol and 160 cc. of concentrated hydrochloric acid and saponified by refluxing for 20 hours. Then the solution was partially concentrated, made alkaline with concentrated ammonia and exhaustively extracted with chloroform. The organic phase was dried over sodium sulfate and concentrated. After purification by prismatic chromatography through aluminum oxide, N-(2-amino-5-bromo-benzyl)-hexamethyleneimine in neutral condition was precipitated from ethyl acetate with hydrochloric acid gas as dihydrochloride and, finally, recrystallized from absolute ethanol. The melting point was 188–192° C. with decomposition.

EXAMPLE 72

*Preparation of N,N-dimethyl-(2-amino-5-bromo-benzyl)-amine*

Using the procedure of Example 68, 5-bromo-2-diacetylaminobenzyl-bromide was reacted with dimethylamine to obtain N,N-dimethyl-(2-amino-5-bromo-benzyl)-amine dihydrochloride having a melting point of 193–198° C. with decomposition.

EXAMPLE 73

*Preparation of N,N-diethyl-(2-amino-5-bromo-benzyl)-amine*

Using the procedure of Example 68, 5-bromo-2-diacetylaminobenzyl-bromide was reacted with diethylamine to obtain N,N-diethyl-(2-amino-5-bromo-benzyl)-amine dihydrochloride having a melting point of 200–204° C. (decomposition).

EXAMPLE 74

*Preparation of N,N-dipropyl-(2-amino-5-bromo-benzyl)-amine*

Using the procedure of Example 68, 5-bromo-2-diacetylaminobenzyl-bromide was reacted with dipropylamine to obtain N,N-dipropyl-(2-amino-5-bromo-benzyl)-amine dihydrochloride having a melting point of 183–186° C. (decomposition).

EXAMPLE 75

*Preparation of N,N-dibutyl-(2-amino-5-bromo-benzyl)-amine*

Using the procedure of Example 68, 5-bromo-2-diacetylaminobenzyl-bromide was reacted with dibutylamine to obtain N,N-dibutyl-(2-amino-5-bromo-benzyl)-amine dihydrochloride having a melting point of 183–188° C. (decomposition).

EXAMPLE 76

*Preparation of N,N-diisobutyl-(2-amino-5-bromo-benzyl)-amine*

Using the procedure of Example 68, 5-bromo-2-diacetylaminobenzyl-bromide was reacted with diisobutylamine to obtain N,N-diisobutyl-(2-amino-5-bromo-benzyl)-amine dihydrochloride having a melting point of 147–153° C.

EXAMPLE 77

*Preparation of N,N-diamyl-(2-amino-5-bromo-benzyl)-amine*

Using the procedure of Example 68, 5-bromo-2-diacetylaminobenzyl-bromide was reacted with diamylamine to obtain N,N-diamyl-(2-amino-5-bromo-benzyl)-amine dihydrochloride having a melting point of 163–169° C. (decomposition).

EXAMPLE 78

*Preparation of N,N-diisoamyl-(2-amino-5-bromo-benzyl)-amine*

Using the procedure of Example 68, 5-bromo-2-diacetylaminobenzyl-bromide was reacted with diisoamylamine to obtain N,N-diisoamyl-(2-amino-5-bromo-benzyl)-amine hydrochloride having a melting point of 167–170° C. (decomposition).

EXAMPLE 79

*Preparation of N,N-dihexyl-(2-amino-5-bromo-benzyl)-amine*

Using the procedure of Example 68, 5-bromo-2-diacetylaminobenzyl-bromide was reacted with dihexylamine to obtain N,N-dihexyl-(2-amino-5-bromo-benzyl)-amine hydrochloride having a melting point of 136.5–138° C. (decomposition).

EXAMPLE 80

*Preparation of N-β-hydroxyethyl-N-methyl-(2-amino-5-bromo-benzyl)-amine*

Using the procedure of Example 68, 5-bromo-2-diacetylaminobenzyl-bromide was reacted with N-methyl-β-hydroethylamine to obtain N-β-hydroxyethyl-N-methyl-(2-amino-5-bromo-benzyl)-amine having a melting point of 63.5–64.5° C.

EXAMPLE 81

*Preparation of N-ethyl-N-cyclohexyl-(2-amino-5-bromo-benzyl)-amine*

Using the procedure of Example 68, 5-bromo-2-diacetylaminobenzyl-bromide was reacted with N-ethyl-cyclohexylamine to obtain N - ethyl - N - cyclohexyl-(2-amino-5-bromo-benzyl)-amine dihydrochloride having a melting point of 179–182° C. (decomposition).

EXAMPLE 82

*Preparation of N,N-dicyclohexyl-(2-amino-5-bromo-benzyl)-amine*

Using the procedure of Example 68, 5-bromo-2-diacetylaminobenzyl-bromide was reacted with dicyclohexylamine to obtain N,N-dicyclohexyl-(2-amino-5-bromo-benzyl)-amine dihydrochloride having a melting point of 304–307° C. (decomposition).

EXAMPLE 83

*Preparation of N,N-diallyl-(2-amino-5-bromo-benzyl)-amine*

Using the procedure of Example 68, 5-bromo-2-diacetylaminobenzyl-bromide was reacted with diallylamine to obtain N,N-diallyl-(2-amino-5-bromo-benzyl)-amine dihydrochloride having a melting poinnt of 160–162° C. (decomposition).

EXAMPLE 84

*Preparation of N-allyl-N-cyclohexyl-(2-amino-5-benzyl)-amine*

Using the procedure of Example 68, 5-bromo-2-diacetylaminobenzyl-bromide was reacted with N-allylcyclohexylamine to obtain N-allyl-N-cyclohexyl-(2-amino-5-bromo-benzyl)-amine dihydrochloride having a melting point of 178–180° C. (decomposition).

EXAMPLE 85

*Preparation of N-benzyl-N-methyl-(2-amino-5-bromobenzyl)-amine*

Using the procedure of Example 68, 5-bromo-2-diacetylaminobenzyl-bromide was reacted with N-methylbenzylamine to obtain N-benzyl-N-methyl-(2-amino-5-bromo-benzyl)-amine dihydrochloride having a melting point of 191–196° C. (decomposition).

EXAMPLE 86

*Preparation of N-ethyl-N-benzyl-(2-amino-5-bromobenzyl)-amine*

Using the procedure of Example 68, 5-bromo-2-diactylaminobenzyl-bromide was reacted with N-ethylbenzylamine to obtain N-ethyl-N-benzyl-(2-amino-5-bromobenzyl)-amine having a melting point of 57–58° C.

EXAMPLE 87

*Preparation of N,N-dibenzyl-(2-amino-5-bromo-benzyl)-amine*

Using the procedure of Example 68, 5-bromo-2-diacetylaminobenzyl-bromide was reacted with dibenzylamine to obtain N,N-dibenzyl-(2-amino-5-bromo-benzyl)-amine dihydrochloride having a melting point of 225–230° C. (decomposition).

EXAMPLE 88

*Preparation of N-(2-amino-5-bromo-benzyl)-pyrrolidine*

Using the procedure of Example 68, 5-bromo-2-diacetylaminobenzyl-bromide was reacted with pyrrolidine to obtain N-(2-amino-5-bromobenzyl)-pyrrolidine dihydrochloride having a melting point of 194–200° C. (decomposition).

EXAMPLE 89

*Preparation of N-(2-amino-5-bromo-benzyl)-piperidine*

Using the procedure of Example 68, 5-bromo-2-diacetylaminobenzyl-bromide was reacted with piperidine to obtain N-(2-amino-5-bromo-benzyl)-amine dihydrochloride having a melting point of 203–207° C. (decomposition).

EXAMPLE 90

*Preparation of N-(2-amino-5-bromo-benzyl)-2'-methyl-piperidine*

Using the procedure of Example 68, 5-bromo-2-diacetylaminobenzyl-bromide was reacted with 2-methyl-piperidine to obtain N-(2-amino-5-bromo-benzyl)-2'-methyl-piperidine dihydrochloride having a melting point 197–200° C. (decomposition).

EXAMPLE 91

*Preparation of N-(2-amino-5-bromo-benzyl)-3'-methyl-piperidine*

Using the procedure of Example 68, 5-bromo-2-diacetylaminobenzyl-bromide was reacted with 3-methyl-piperidine to obtain N-(2-amino-5-bromo-benzyl)-3'-methyl-piperidine dihydrochloride having a melting point of 205–209° C. (decomposition).

EXAMPLE 92

*Preparation of N-(2-amino-5-bromo-benzyl)-4'-methyl-piperidine*

Using the procedure of Example 68, 5-bromo-2-diacetylaminobenzyl-bromide was reacted with 4-methyl-piperidine to obtain N-(2-amino-5-bromo-benzyl)-4'-methyl-piperidine hydrochloride having a melting point of 211–213° C. (decomposition).

EXAMPLE 93

*Preparation of N-(2-amino-5-bromo-benzyl)-2'-ethyl-piperidine*

Using the procedure of Example 68, 5-bromo-2-diacetylaminobenzyl-bromide was reacted with 2-ethyl-piperidine to obtain N-(2-amino-5-bromo-benzyl)-2'-ethyl-piperidine dihydrochloride having a melting point of 193–198° C. (decomposition).

EXAMPLE 94

*Preparation of N-(2-amino-5-bromo-benzyl)-N'-methyl-piperazine*

Using the procedure of Example 68, 5-bromo-2-diacetylaminobenzyl-bromide was reacted with N-methyl-piperazine to obtain N-(2-amino-5-bromo-benzyl)-N'-methyl-piperazine trihydrochloride having a melting point of 220–228° C. (decomposition).

EXAMPLE 95

*Preparation of N-methyl-N-2'-picolyl-(2-amino-5-bromo-benzyl)-amine*

Using the procedure of Example 68, 5-bromo-2-diacetylaminobenzyl-bromide was reacted with N-methyl-2-picolylamine to obtain N-methyl-N-2'-picolyl-(2-amino-5-bromo-benzyl)-amine trihydrochloride having a melting point of 174–177° C. (decomposition).

EXAMPLE 96

*Preparation of N-methyl-N-phenyl-(2-amino-6-chloro-benzyl)-amine*

Using the procedure of Example 68, 6-chloro-2-diacetylaminobenzyl-bromide was reacted with N-methyl-aniline to obtain N-methyl-N-phenyl-(2-amino-6-chloro-benzyl)-amine dihydrochloride in form of a noncrystallisable substance.

EXAMPLE 97

*Preparation of N,N-diisopropyl-(2-amino-6-chloro-benzyl)-amine*

Using the procedure of Example 68, 6-chloro-2-diacetylaminobenzyl-bromide was reacted with diisopropylamine to obtain N,N-diisopropyl-(2-amino-6-chloro-benzyl)-amine dihydrochloride having a melting point of 198–203° C. (decomposition).

EXAMPLE 98

*Preparation of N,N-dibutyl-(2-amino-6-chloro-benzyl)-amine*

Using the procedure of Example 68, 6-chloro-2-diacetylaminobenzyl-bromide was reacted with dibutylamine to obtain N,N-dibutyl-(2-amino-6-chloro-benzyl)-amine dihydrochloride having a melting point of 174–178° C. (decomposition).

EXAMPLE 99

*Preparation of N,N-diisobutyl-(2-amino-6-chloro-benzyl)-amine*

Using the procedure of Example 68, 6-chloro-2-diacetylaminobenzyl-bromide was reacted with diisobutylamine to obtain N,N-diisobutyl-(2 - amino-6 - chloro - benzyl)-amine dihydrochloride having a melting point of 156–159° C. (decomposition).

EXAMPLE 100

*Preparation of N,N-diamyl-(2-amino-6-chloro-benzyl)-amine*

Using the procedure of Example 68, 6-chloro-2-diacetylaminobenzyl-bromide was reacted with diamylamine to obtain N,N-diamyl-(2-amino-6-chloro-benzyl)-amine dihydrochloride having a melting point of 152–158° C. (decomposition).

EXAMPLE 101

*Preparation of N-cyclohexyl-N-methyl-(2-amino-6-chloro-benzyl)-amine*

Using the procedure of Example 68, 6-chloro-2-diacetylaminobenzyl-bromide was reacted with N-methyl-cyclohexylamine to obtain N-cyclohexyl-N-methyl-(2-amino-6-chloro-benzyl)-amine dihydrochloride having a melting point of 200–210° C. (decomposition).

EXAMPLE 102

*Preparation of N-ethyl-N-cyclohexyl-(2-amino-6-chloro-benzyl)-amine*

Using the procedure of Example 68, 6-chloro-2-diacetylaminobenzyl-bromide was reacted with N-ethyl-cyclohexylamine to obtain N-ethyl-N-cyclohexyl-(2-amino-6-chloro-benzyl)-amine dihydrochloride having a melting point of 176–180° C. (decomposition).

EXAMPLE 103

*Preparation of N-(2-amino-6-chloro-benzyl)-piperidine*

Using the procedure of Example 68, 6-chloro-2-diacetylaminobenzyl-bromide was reacted with piperidine to obtain N-(2-amino-6-chloro - benzyl) - piperidine dihydrochloride having a melting point of 205–208° C. (decomposition).

EXAMPLE 104

*Preparation of N-(2-amino-6-chloro-benzyl)-hexamethylenimine*

Using the procedure of Example 68, 6-chloro-2-diacetylaminobenzyl-bromide was reacted with hexamethylenimine to obtain N-(2-amino-6-chloro-benzyl)-hexamethylenimine dihydrochloride 193–197° C. (decomposition).

EXAMPLE 105

*Preparation of N,N-dipropyl-(2-amino-3-chloro-benzyl)-amine*

Using the procedure of Example 68, 3-chloro-2-diacetylaminobenzyl-bromide was reacted with dipropylamine to obtain N,N-dipropyl-(2-amino-3-chloro - benzyl) - amine dihydrochloride having a melting point of 172–180° C.

EXAMPLE 106

*Preparation of N,N-diisopropyl-(2-amino-3-chloro-benzyl)-amine*

Using the procedure of Example 68, 3-chloro-2-diacetylaminobenzyl-bromide was reacted with diisopropylamine to obtain N,N-diisopropyl-(2-amino - 3 - chloro - benzyl)-amine hydrochloride having a melting point of 181–186° C.

EXAMPLE 107

*Preparation of N,N-dibutyl-(2-amino-3-chloro-benzyl)-amine*

Using the procedure of Example 68, 3-chloro-2-diacetylaminobenzyl-bromide was reacted with dibutylamine to obtain N,N-dibutyl-(2-amino-3-chloro-benzyl)-amine dihydrochloride having a melting point of 158–167° C.

EXAMPLE 108

*Preparation of N,N-diisobutyl-(2-amino-3-chloro-benzyl)-amine*

Using the procedure of Example 68, 3-chloro-2-diacetylaminobenzyl-bromide was reacted with diisobutylamine to obtain N,N-diisobutyl-(2-amino-3-chloro - benzyl) - amine dihydrochloride having a melting point of 167–174° C.

EXAMPLE 109

*Preparation of N,N-diamyl-(2-amino-3-chloro-benzyl)-amine*

Using the procedure of Example 68, 3-chloro-2-diacetylaminobenzyl-bromide was reacted with diamylamine to obtain N,N-diamyl-(2-amino-3-chloro-benzyl)-amine dihydrochloride having a melting point of 144–150° C.

EXAMPLE 110

*Preparation of N-cyclohexyl-N-methyl-(2-amino-3-chlorobenzyl)-amine*

Using the procedure of Example 68, 3-chloro-2-diacetylaminobenzyl-bromide was reacted with N-methyl-cyclohexylamine to obtain N-cyclohexyl-N-methyl-(2-amino-3-chloro-benzyl)-amine dihydrochloride having a melting point of 165–173° C. (decomposition).

EXAMPLE 111

*Preparation of N-ethyl-N-cyclohexyl-(2-amino-3-chlorobenzyl)-amine*

Using the procedure of Example 68, 3-chloro-2-diacetylaminobenzyl-bromide was reacted with N-ethyl-cyclohexylamine to obtain N-ethyl-N-cyclohexyl-(2-amino-3-chloro-benzyl)-amine hydrochloride having a melting point of 177–179° C. (decomposition).

EXAMPLE 112

*Preparation of N-(2-amino-3-chloro-benzyl)-2'-methyl-piperidine*

Using the procedure of Example 68, 3-chloro-2-diacetylaminobenzyl-bromide was reacted with 2-methyl-piperidine to obtain N-(2-amino-3-chloro-benzyl)-2'-methyl-piperidine hydrochloride having a melting point of 225–226° C. (decomposition).

EXAMPLE 113

*Preparation of N-benzyl-N-methyl-(2-amino-3-chloro-benzyl)-amine*

Using the procedure of Example 68, 3-chloro-2-diacetylaminobenzyl-bromide was reacted with N-methyl-benzyl-amine to obtain N-benzyl-N-methyl-(2-amino-3-chloro-benzyl)-amine hydrochloride having a melting point of 193–194° C. (decomposition).

EXAMPLE 114

*Preparation of N,N-diisopropyl-(2-amino-5-chloro-benzyl)-amine*

Using the procedure of Example 70, 2-amino-5-chloro-N,N-diisopropyl-benzamide was reacted with lithium aluminum hydride to obtain N,N-diisopropyl-(2-amino-5-chloro-benzyl)-amine dihydrochloride having a melting point of 178–183° C. (decomposition).

EXAMPLE 115

*Drops.*—The drop solution is compounded from the following ingredients:

| | Parts |
|---|---|
| N-(2-amino - 3,5 - dibromo - benzyl-N-methyl-cyclohexylamine hydrochloride | 0.33 |
| p-Hydroxy-benzoic acid methyl ester | 0.07 |
| p-Hydroxy-benzoic acid propyl ester | 0.03 |
| Polyvinyl pyrrolidone | 5.0 |
| Distilled water | 95.57 |
| Total | 101.00 |

*Compounding procedure.*—The distilled water is heated to 80° C. and then the p-hydroxy-benzoic acid esters, the polyvinyl pyrrolidone and the active ingredient are dissolved therein in that order. The resulting solution is cooled and is filtered until free from suspended matter. 20 drops of this solution (about 1.2 cc.) contain 4.0 mgm. of N-(2-amino-3,5-dibromo-benzyl) - N - methyl-cyclohexylamine hydrochloride.

EXAMPLE 116

*Tablets.*—The tablets are compounded from the following ingredients:

| | Parts |
|---|---|
| N-(2-amino - 3,5 - dibromo - benzyl)-N-methyl-cyclohexylamine hydrochloride | 2.0 |
| Lactose | 60.0 |
| Potato starch, dry | 43.0 |
| Soluble starch | 4.0 |
| Magnesium stearate | 1.0 |
| Total | 110.0 |

*Compounding procedure.*—The active ingredient and the lactose are thoroughly blended with each other and the mixture is admixed with the potato starch, and this mixture is granulated by moistening it with an aqueous 20% solution of the soluble starch, and passing the moistened mixture through a 1 mm. mesh screen. The moist granulate is then dried at 40° C., again passed through the screen, and finally admixed with the magnesium stearate. The resulting mixture is then pressed into tablets weighing 110 mgm. each.

EXAMPLE 117

*Coated pills.*—The tablets obtained in the preceding example are provided with a thin shell consisting essentially of sugar and talcum in the customary manner. The coated pills thus obtained are then polished with beeswax. Each coated pill weighs about 170 mgm. and contains 4.0 mgm. of the active ingredient.

EXAMPLE 118

*Gelation capsules.*—The contents of the capsules are compounded from the following ingredients:

| | Parts |
|---|---|
| N-(2-amino - 3,5 - dibromo - benzyl)-N-methyl-cyclohexylamine hydrochloride | 4.0 |
| Lactose | 96.0 |
| Total | 100.0 |

*Compounding procedure.*—The active ingredient is thoroughly blended with the lactose, and the mixture is filled into gelatin capsules of sufficient size to hold 100 mgm. of the mixture.

EXAMPLE 119

*Hypodermic solution.*—The hypodermic solution is compounded from the folowing ingredients:

| | |
|---|---|
| N-(2-amino - 3,5 - dibromo - benzyl)-N-methyl-cyclohexylamine hydrochloride parts | 2.0 |
| Polyvinyl pyrrolidone do | 30.0 |
| Distilled water, q.s.ad parts by volume | 1000 |

*Compounding procedure.*—The distilled water is heated to 80° C. and then the polyvinyl pyrrolidone and the active ingredient are dissolved therein that order, accompanied by stirring. The resulting solution is cooled, diluted with additional distilled water to the desired volume and filtered until free from suspended matter. The solution is then filled into white 1 cc. ampules which are sterilized for 20 minutes at 100° C.

EXAMPLE 120

*Syrup.*—The syrup is compounded from the following ingredients:

| | Parts |
|---|---|
| N-(2-amino - 3,5 - dibromo-benzyl)-N-methyl-cyclohexylamine hydrochloride | 0.04 |
| Sodium benzoate | 0.2 |
| Ammonium chloride | 0.7 |
| Saccharin sodium | 0.2 |
| Sugar | 65.0 |
| Blue Food Coloring No. 2 | 0.002 |
| Red Food Coloring No. 2 | 0.007 |
| Yellow Food Coloring No. 2 | 0.024 |
| Raspberry flavoring | 0.4 |
| Menthol | 0.015 |
| Ethanol | 4.0 |
| Distilled water | 54.412 |
| Total | 125.000 |

*Compounding procedure.*—The sugar and the active ingredient are dissolved in 45.412 parts of the distilled water accompanied by heating. The resulting solution is cooled (Solution A). The sodium benzoate, the ammonium chloride, the saccharin sodium and the food colorings are dissolved in the remaining amount of distilled water (Solution B). The menthol is dissolved in the ethanol (Solution C). Solution B is first stirred into Solution A, and then Solution C is added. Finally, the raspberry flavoring is added and the resulting syrup is filtered until free from suspended matter. 10 cc. of the syrup containing 4 mgm. of the active ingredient.

The dosage unit compositions comprising the compounds of the present invention as active ingredients may also contain other active ingredients. The following examples illustrate such compositions comprising additional active ingredients besides the compounds of the present invention.

EXAMPLE 121

*Tablets.*—The tablets are compounded from the following ingredients:

| | Parts |
|---|---|
| N - (2 - amino-3,5-dibromo-benzyl)-N-methyl-cyclohexylamine hydrochloride | 4.0 |
| 1 - (p - chlorophenyl) - 2,3 - dimethyl - 4 - dimethylamino - butanol - (2) hydrochloride | 40.0 |
| 1 - (3,5 - dihydroxyphenyl) - 2 - isopropyl - aminoethane sulfate | 10.0 |
| Silicic acid, pressed | 61.0 |
| Lactose | 50.0 |
| Corn starch, dry | 50.0 |
| Tartaric acid | 2.0 |
| Silicic acid, unpressed | 2.0 |
| Magnesium stearate | 1.0 |
| Total | 220.0 |

*Compounding procedure.*—The active ingredients, the pressed silicic acid, the lactose and the corn starch are admixed with each other, and the resulting mixture is granulated by moistening it with a 1.5% solution of the tartaric acid in ethanol and passing the moist mix through a 1 mm. mesh screen. The moist granulate is dried at 40° C. and is again passed through the screen. The resulting dry granulate is admixed with the unpressed silicic acid and with the magnesium stearate and the resulting mix is pressed into tablets weighing 220 mgm. each.

EXAMPLE 122

*Syrup.*—The syrup is compounded from the following ingredients:

| Ingredient | Parts |
|---|---|
| N - (2 - amino - 3,5 - dibromo - benzyl) - N-methyl - cyclohexylamine hydrochloride | 0.02 |
| 1 - (p - chlorophenyl) - 2,3 - dimethyl - 4 - dimethylamino - butanol - (2) hydrochloride | 0.4 |
| 1 - (3,5 - dihydroxyphenyl) - 2 - isopropyl - aminoethane sulfate | 0.1 |
| Sodium benzoate | 0.2 |
| Ammonium chloride | 0.7 |
| Saccharin sodium | 0.2 |
| Sugar | 65.0 |
| Blue Food Coloring No. 2 | 0.002 |
| Red Food Coloring No. 2 | 0.007 |
| Yellow Food Coloring No. 2 | 0.024 |
| Eucalyptus-menthol flavoring | 0.1 |
| Menthol | 0.015 |
| Ethanol | 4.0 |
| Distilled water | 54.232 |
| Total | 125.000 |

*Compounding procedure.*—The sugar and the benzylamine active ingredient are dissolved in 45.232 parts of distilled water, accompanied by heating. The resulting solution is cooled (Solution A). The sodium benzoate, the ammonium chloride, the saccharin sodium and the food colorings are dissolved in the remaining amount of distilled water (Solution B). The menthol and the eucalyptus-menthol flavoring are dissolved in the ethanol (Solution C). First Solution B and then Solution C are stirred into Solution A. The resulting syrup is filtered until free from suspended matter. 10 cc. of the syrup contained 2 mgm. of N-(2-amino-3,5 - dibromo-benzyl)-N-methyl-cyclohexylamine hydrochloride, 40 mgm. of 1-(p-chlorophenyl)-2,3-dimethyl-4-dimethylaminobutanol-(2)-hydrochloride and 10 mgm. of 1-(3,5-dihydroxyphenyl)-2-isopropylaminoethane sulfate.

EXAMPLE 123

*Hypodermic solution.*—The solution is compounded from the following ingredients:

| Ingredient | | |
|---|---|---|
| N,N-diethyl-(2-amino-4-bromobenzyl)-amine dihydrochloride | parts | 4.0 |
| Tartaric acid | do | 2.0 |
| Dextrose | do | 95.0 |
| Distilled water, q.s.ad. | parts by volume | 2000.0 |

*Compounding procedure.*—About 90% of the required amount of water is heated to 80° C., and the tartaric acid and benzylamine compounds are dissolved therein. The solution is cooled to room temperature, the dextrose is dissolved therein, and the solution is diluted to the required volume with distilled water. The finished solution is then filtered until free from suspended particles under substantially aseptic conditions. The filtered solution is filled into 2 cc. ampules, which are sterilized for 20 minutes at 120° C. and sealed. Each ampule contains 4.0 mgm. of the active ingredient.

EXAMPLE 124

*Drops.*—The drop solution is compounded from the following ingredients:

| Ingredient | Parts |
|---|---|
| N,N - diethyl-(2-amino-4-bromobenzyl)-amine dihydrochloride | 0.2 |
| Tartaric acid | 0.1 |
| p-Hydroxy-benzoic acid methyl ester | 0.1 |
| Distilled water | 99.6 |
| Total | 100.0 |

*Compounding procedure.*—The distilled water is heated to 80° C. and then the hydroxy-benzoic acid ester, the tartaric acid and the benzylamine compound are successively dissolved therein. The solution is then cooled and filtered. One ml. (about 15 drops) of the solution contains 2 mgm. of the active ingredient.

EXAMPLE 125

*Syrup.*—The syrup is compounded from the following ingredients:

| Ingredient | Parts |
|---|---|
| N,N - diamyl - (2-amino-4-bromobenzyl)-amine dihydrochloride | 0.5 |
| Sodium benzoate | 0.2 |
| Ammonium chloride | 0.7 |
| Saccharin sodium | 0.2 |
| Sugar | 65.0 |
| Certified food colors | 0.033 |
| Raspberry flavoring | 0.4 |
| Menthol | 0.015 |
| Ethanol | 4.0 |
| Distilled water | 53.952 |
| Total | 125.00 |

*Compounding procedure.*—The sugar and the benzylamine compound are dissolved in 45.952 parts of warm distilled water, and the resulting solution is allowed to cool (Solution A). The sodium benzoate, the ammonium chloride, the saccharin sodium and the food colors are dissolved in the remaining amount of distilled water (Solution B). The menthol is dissolved in the ethanol (Solution C). First Solution B and then Solution C are stirred into Solution A. Finally, the raspberry flavoring is added to the combined solution, and the finished syrup is filtered until free from suspended particles. 10 cc. of syrup contain 50 mgm. of the active ingredient. The syrup is an effective cough syrup adapted for peroral administration.

EXAMPLE 126

*Tablets.*—The tablet composition is compounded from the following ingredients:

| Ingredient | Parts |
|---|---|
| N - (2-bromo-4-amino-benzyl)-morpholine hydrochloride | 4.0 |
| Lactose | 79.0 |
| Potato starch | 34.5 |
| Gelatin | 2.0 |
| Magnesium stearate | 0.5 |
| Total | 120.0 |

*Compounding procedure.*—The benzylamine compound is intimately admixed with the lactose and with the potato starch, and the resulting mixture is moistened with an aqueous 10% solution of the gelatin. The moist mixture is forced through a 1 mm.-mesh screen, and the moist granulate thus obtained is dried at 40° C. The dry granulate is again passed through the screen and is subsequently intimately admixed with the magnesium stearate. The mixture is finally pressed into 120 mgm. tablets. Each tablet contains 4 mgm. of the active ingredient.

EXAMPLE 127

*Coated pills.*—The tablets obtained in the preceding example are coated with a thin shell consisting essentially of sugar and talcum. The coated tablets are then polished with beeswax. Each coated pill weighs approximately 200 mgm. and also contains 4 mgm. of the active ingredient.

EXAMPLE 128

*Aerosol.*—The aerosol composition is compounded from the following ingredients:

| | Parts |
|---|---|
| N - (2-bromo-4-amino-benzyl)-morpholine hydrochloride | 300.0 |
| Sorbitan trioleate | 135.0 |
| Isopropyl myristate | 75.0 |
| Trifluoro-trichloro-ethane | 75.0 |
| Propellant gas mixture of monofluoro-trichloro-methane, difluoro-dichloro-methane and tetrafluoro-dichloro-ethane in weight ratio 23:54:23, q.s.ad | 10,500 |

*Compounding procedure.*—The micronized benzylamine compound (max. particle size 5μ is triturated and homogenized with a mixture of the isopropyl myristate and the sorbitan trioleate. The resulting suspension is cooled and is admixed by stirring with the trifluoro-trichloro-ethane. 585 mgm. portions of the resulting suspension are filled into aerosol containers. Thereafter, enough of the deep-cooled, liquid propellant gas mixture is added to each container to make 10.5 gm., whereupon the containers are sealed with a valve which meters out 70 mgm. of the contents each time it is actuated. Each container holds 150 individual doses of the aerosol mixture, and each dose contains 2 mgm. of the active ingredient.

Various modifications of the compositions of the invention may be made without departing from the spirit or scope thereof and it is to be understood that the invention is to be limited only as defined in the appended claims.

I claim:
1. An amino-halo-benzylamine of the formula selected from the group consisting of

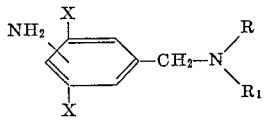

and

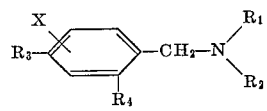

wherein X is a halogen selected from the group consisting of chlorine and bromine, R is selected from the group consisting of hydrogen, lower alkyl, hydroxy lower alkyl, lower alkenyl, cycloalkyl of 5 to 6 carbon atoms, phenyl lower alkyl, phenyl $R_1$ and $R_2$ are selected from the group consisting of lower alkyl, lower alkenyl, hydroxy lower alkyl, cycloalkyl of 5 to 6 carbon atoms, phenyl lower alkyl, phenyl and pyridyl lower alkyl, and R and $R_1$ and $R_1$ and $R_2$ when taken together with the nitrogen atom form a heterocyclic selected from the group consisting of pyrrolidino, lower alkyl pyrrolidino, piperidino, lower alkly piperidino, piperazino, lower alkyl piperazino, hexamethylenimino, lower alkyl hexamethylenimino, and $R_3$ and $R_4$ are different and are selected from the group consisting of hydrogen and —$NH_2$ and their non-toxic, pharmacologically acceptable acid addition salts.

2. N - (2-amino-3,5-dibromo-benzyl)-N-methylcyclohexylamine.
3. N - (2 - amino - 3,5-dibromo-benzyl)-diisobutylamine.
4. N - (2 - amino - 3,5 - dibromo-benzyl)-dicyclohexylamine.
5. N - (2 - amino - 3,5 - dibromo-benzyl) - dimethylamine.
6. N - (4 - amino-3,5-dibromo-benzyl)-N-methylcyclohexylamine.
7. N - (2 - amino - 3,5 - dibromo-benzyl)-cyclohexylamine.
8. N,N-diethyl-N-(2-amino-4-bromo-benzyl)-amine.
9. N,N-diamyl-N-(2-amino-4-bromo-benzyl)-amine.
10. N-(2-bromo-4-amino-benzyl)-morpholine.

References Cited

Keck, Johannes, Chemical Abstracts, vol. 59, pages 547–8 (1963).

ALEX MAZEL, *Primary Examiner.*

JOSE TOVAR, *Assistant Examiner.*

UNITED STATES PATENT OFFICE
CERTIFICATE OF CORRECTION

Patent No. 3,336,308                                August 15, 1967

Johannes Keck

It is hereby certified that error appears in the above numbered patent requiring correction and that the said Letters Patent should read as corrected below.

In the heading to the printed specification, line 7, after "Germany," insert -- Nov. 21, 1961, T 21,147; --; column 1, line 51, for "an" read -- and --; column 3, in the first formula, for "$R_1$" read -- R --; same formula, for "$R_2$" read -- $R_1$ --;

column 4, line 74, for "chlorofoorm" read -- chloroform --; column 5, line 56, for "acocmpanied" read -- accompanied --; column 8, in the last formula, for "rB" read -- Br --; column 12, line 9, for "6" read -- 5 --.

Signed and sealed this 19th day of November 1968.

(SEAL)
Attest:

Edward M. Fletcher, Jr.                              EDWARD J. BRENNER

Attesting Officer                                         Commissioner of Patents